United States Patent
Tanksalvala et al.

(10) Patent No.: US 11,709,132 B2
(45) Date of Patent: Jul. 25, 2023

(54) MODULUS-ENFORCED PROBE

(71) Applicant: The Regents of the University of Colorado, a body corporate, Denver, CO (US)

(72) Inventors: Michael Tanksalvala, Longmont, CO (US); Daniel E. Adams, Thornton, CO (US); Dennis Gardner, Alexandria, VA (US); Christina L. Porter, Superior, CO (US); Giulia F. Mancini, Boulder, CO (US); Margaret M. Murnane, Boulder, CO (US); Henry C. Kapteyn, Boulder, CO (US)

(73) Assignee: Regents of the University of Colorado, a body corporate, Denver, CO (US)

(*) Notice: Subject to any disclaimer, the term of this patent is extended or adjusted under 35 U.S.C. 154(b) by 1021 days.

(21) Appl. No.: 16/302,911

(22) PCT Filed: May 18, 2017

(86) PCT No.: PCT/US2017/033397
§ 371 (c)(1),
(2) Date: Nov. 19, 2018

(87) PCT Pub. No.: WO2017/201327
PCT Pub. Date: Nov. 23, 2017

(65) Prior Publication Data
US 2019/0204218 A1 Jul. 4, 2019

Related U.S. Application Data

(60) Provisional application No. 62/338,961, filed on May 19, 2016.

(51) Int. Cl.
*G01N 21/47* (2006.01)
*G01N 21/956* (2006.01)
(Continued)

(52) U.S. Cl.
CPC ......... *G01N 21/4788* (2013.01); *G01N 21/33* (2013.01); *G01N 21/45* (2013.01);
(Continued)

(58) Field of Classification Search
CPC ..... G01N 2021/1782; G01N 2021/335; G01N 2021/4711; G01N 21/33; G01N 21/45;
(Continued)

(56) References Cited

U.S. PATENT DOCUMENTS 10,921,229 B2 * 2/2021 Shamir .................. G01N 15/06
2004/0169863 A1 9/2004 Kawate
(Continued)

OTHER PUBLICATIONS

Stockmar et al. "Near-field ptychography: phase retrieval for inline holography using a structured illumination." Sci Rep. 3:1927 (2013) (Year: 2013).*
(Continued)

*Primary Examiner* — Hina F Ayub
(74) *Attorney, Agent, or Firm* — Macheledt Bales LLP; Jennifer L. Bales

(57) ABSTRACT

Apparatus and methods for forming an image of an object which involves focusing partially to fully spatially-coherent radiation onto a sample and collecting the resulting scattered radiation (the "standard data set") on an array detector. In addition to the standard dataset, an additional measurement or plurality of measurements is made of a relatively-unscattered beam, using the array detector, which comprises the "modulus enforced probe (MEP) dataset". This MEP dataset serves as an extra constraint, called the MEP constraint, in the phase retrieval algorithm used to reconstruct the image of the object.

17 Claims, 5 Drawing Sheets

(51) Int. Cl.
*G01N 21/45* (2006.01)
*G01N 21/33* (2006.01)
*G01N 21/17* (2006.01)

(52) U.S. Cl.
CPC ....... *G01N 21/4795* (2013.01); *G01N 21/956* (2013.01); *G01N 2021/1782* (2013.01); *G01N 2021/335* (2013.01); *G01N 2021/4711* (2013.01); *G01N 2201/061* (2013.01)

(58) Field of Classification Search
CPC ........... G01N 21/4788; G01N 21/4795; G01N 21/956; G01N 2201/061
See application file for complete search history.

(56) References Cited

U.S. PATENT DOCUMENTS

| | | | |
|---|---|---|---|
| 2005/0001172 A1 | 1/2005 | Harrison et al. | |
| 2008/0296509 A1* | 12/2008 | Schroder | H01J 37/295 250/398 |
| 2009/0059227 A1* | 3/2009 | Plant | G01N 21/53 356/364 |
| 2010/0284027 A1 | 11/2010 | Scheiner | |
| 2011/0075928 A1 | 3/2011 | Jeong et al. | |
| 2014/0213909 A1 | 7/2014 | Mestha et al. | |
| 2015/0345934 A1* | 12/2015 | Shafir | G01B 11/02 356/614 |
| 2016/0011523 A1 | 1/2016 | Singh et al. | |
| 2016/0187849 A1 | 6/2016 | Zhang et al. | |
| 2016/0252453 A1* | 9/2016 | Lewis | G01N 15/1463 356/51 |
| 2016/0273906 A1 | 9/2016 | Pisarenco et al. | |

OTHER PUBLICATIONS

Soft X-ray spectromicroscopy using ptychography with randomly phased illumination, A.M. Maiden et al., Nature Communications, Apr. 9, 2013.

Quantitative Chemically Specific Coherent Diffractive Imaging of Reactions at Buried Interfaces with Few Nanometer Precision, Elisabeth R. Shanblatt et al., Nano Letters, Jul. 22, 2016.

Ptychographic hyperspeclial spectromicroscopy with an extreme ultraviolet high harmonic comb, Bosheng Zhang et al., Optics Express, Aug. 8, 2016.

* cited by examiner

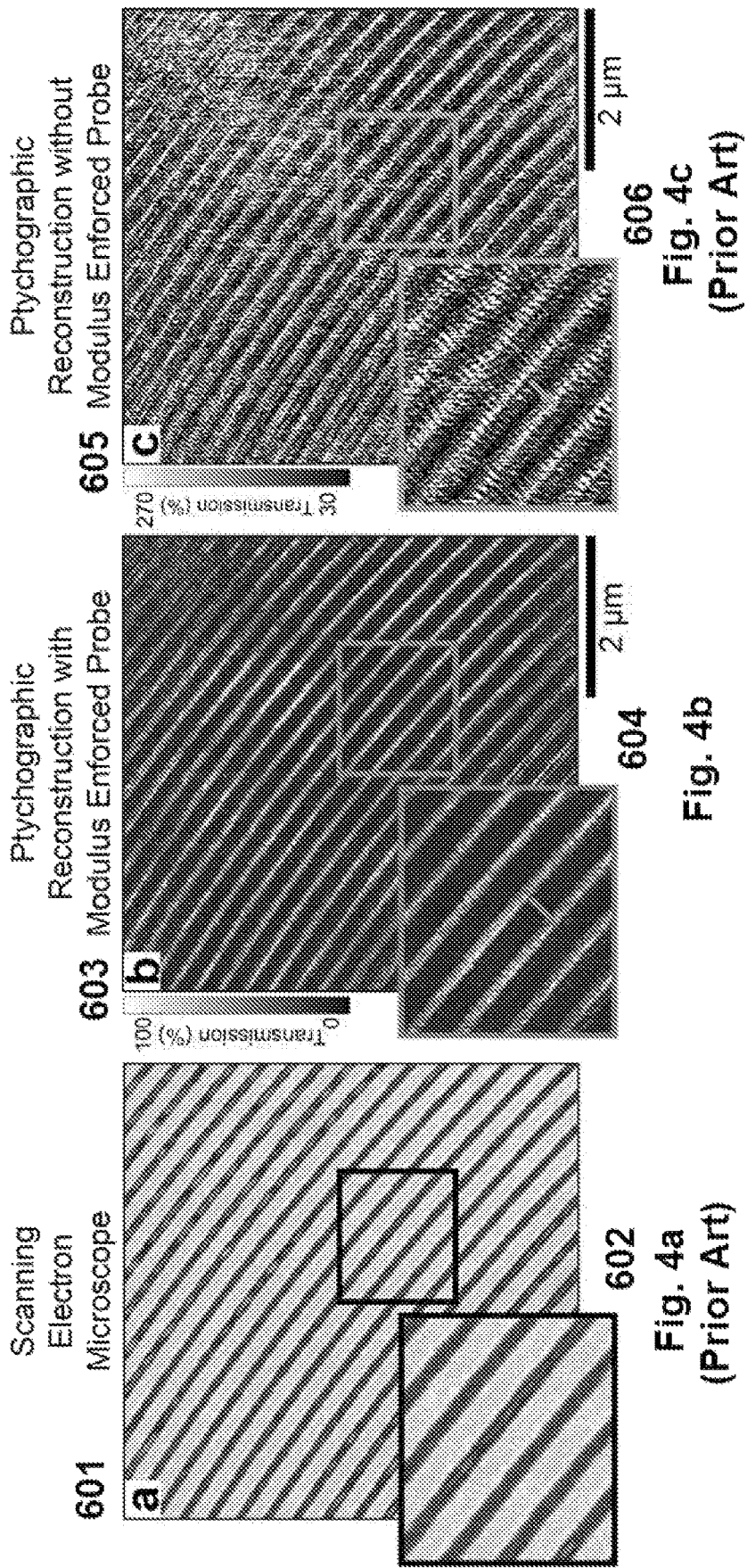

MODULUS-ENFORCED PROBE

This invention was made with government support under grant number W31P4Q-13-1-0015 awarded by DARPA. The government has certain rights in the invention.

FIELD OF THE INVENTION

The present invention relates to microscopy and other forms of imaging using coherent light. In particular, the present invention relates to coherent diffractive imaging (CDI) with an additional measurement that improves the robustness, resolution, and the capabilities of CDI.

BACKGROUND OF THE INVENTION

Coherent diffraction imaging (CDI) is an emerging set of techniques for phase-sensitive imaging. In CDI, radiation is scattered from a sample of interest and recorded on an array detector. The resulting image can be processed with a phase retrieval algorithm to recover some information about the sample of interest. The radiation, referred to as the illumination or the probe, can be of general composition, but is often composed of a beam of light or of electrons. Here, scattering is defined as the interaction of the radiation with the sample, including diffraction or refraction.

FIG. 1a (Prior Art) shows a conventional transmission CDI geometry, in which the incident radiation illuminates a portion of the sample and the scattered radiation is measured on a detector. FIG. 1a depicts the acquisition of standard dataset 107 in transmission-mode. Incident radiation 101 is focused by focusing optic 102 into focusing beam 103 that is incident on the sample to be imaged 104. The transmitted scattered light 105 is recorded on detector 106. A series of mechanical stages 108 actuates sample 104. The one or more images acquired during this process form the standard transmission-mode dataset 107.

FIG. 1b (Prior Art) shows a conventional reflection CDI geometry, in which incident radiation illuminates a portion of the sample, and the radiation that is scattered from the sample is measured on a detector. FIG. 1b depicts the acquisition of standard dataset 207 in reflection-mode. Incident radiation 201 is focused by focusing optic 202 into focusing beam 203 that is incident on the sample to be imaged 204. The reflected scattered light 205 is recorded on detector 206. A series of mechanical stages 208 actuates the sample 204. The one or more images acquired during this process form the standard reflection-mode dataset 207.

The scattered radiation can be collected for many configurations of the sample, illumination, and detector. For instance, one could record the scatter patterns for many relative translations or rotations between the sample and illumination. These recorded patterns form the standard dataset 107, 207.

The standard dataset may include many relative lateral translations between the probe and object with overlapping fields of view between the positions, composing a ptychographic dataset, which published ptychographic algorithms can reconstruct (ptychographic dataset). The standard dataset may include many relative translations along the sample normal, composing a through-focus dataset, in which case minor variants of published ptychographic algorithms (which incorporate axial translations in addition to lateral translations) can be used for reconstruction. The standard dataset may include multiple incident angles, composing a tomographic or diffraction tomographic dataset that published diffraction tomographic algorithms can reconstruct. The standard dataset may include multiple time delays between the illumination and a dynamic process, forming a dynamic dataset. The standard dataset may include measured interference between radiation scattered from the sample and a reference oscillator, composing a holographic dataset. The standard dataset may include multiple spatial or temporal modes of the illuminating beam, forming a multimode dataset, which published algorithms (orthogonal probe relaxation) can reconstruct. The standard dataset may be collected with multiple mutually-incoherent modes (wavelengths, polarizations, time delays) either simultaneously or sequentially incident on the sample, forming a mutually-incoherent multimode dataset, which published algorithms (ptychographic information multiplexing) can reconstruct. The standard dataset may include scanning a focused beam across the sample and measuring its real or complex transmission or reflection. If the beam is composed of x-rays, this forms a scanning transmission x-ray microscopy (STXM) or scanning reflection x-ray microscopy (SRXM) dataset. If the beam is composed of electrons, this forms an electron microscopy dataset, such as scanning electron microscopy (SEM), transmission electron microscopy (TEM) or scanning transmission electron microscopy (STEM). Those skilled in the art of CDI will recognize that the methods of this invention apply to Fourier ptychography, to recover the pupil function instead of the illumination function.

FIG. 3a (Prior Art) shows the workflow for standard ptychographic phase retrieval 600. The input illumination guess 501a and object guess 502a are used as initial guesses for the illumination 501 and object 502. The ptychographic probe update 504a and object update 504b are applied, using the standard dataset 107,207, forming updated guesses for the illumination 505 and object 506. These are used in future iterations as the guess at the illumination 501 and object 502. After a stopping criterion has been reached, such as an error metric dropping below some threshold value, the algorithm terminates, and outputs the final updated illumination guess 505 and object guess 506 as the finalized output illumination 615 and object 616.

Many CDI algorithms exist to retrieve the complex exit surface wave of the sample from the dataset. In order to retrieve the complex transmittance or reflectance of the sample, the amplitude and phase of the probe must be separated out from the exit-surface wave. Some algorithms, such as ptychography, attempt to perform this as an iterative deconvolution, while others either attempt to simply divide out the probe or simply suffer from a degraded resolution, such as in Fourier transform holography. None of these methods work stably in the absence of a good guess of the complex illumination function, and most do not work well if the sample is periodic. If the complex illumination function has unknown character or if it has multiple partially to totally mutually-incoherent modes, existing methods are rendered less effective. Furthermore, if the absolute reflectance or transmittance of the sample is important, instead of the reflectance or transmittance with an overall scaling ambiguity, very special care must be taken in any existing method to ensure that the power in the reconstructed illumination is correct. Typically, this involves an extra series of calibrated measurements of the illumination and detector efficiency.

These limitations inhibit the resolution, fidelity and overall precision of reconstructions obtained with conventional CDI techniques. A need remains in the art for methods to robustly measure the absolute amplitude and phase of the transmittance or reflectance of a sample without prior knowledge of the illumination in the sample plane, and in the presence of a periodic object or mutually-incoherent modes of the illumination.

SUMMARY

An objective of the present invention is to provide methods and an apparatus by which to measure a sample's complex transmittance or reflectance without prior knowledge of the illumination at the sample plane. This invention includes techniques for significantly improving the convergence and robustness of any coherent diffraction imaging technique. It further extends phase-diverse coherent diffraction imaging methods to be applicable to situations where the illumination is not constant between frames of a multi-frame dataset and may not be known a priori. This technique also provides a straightforward method by which to obtain absolute reflectivity or transmissivity images of a sample, that is, without an ambiguity in the overall amplitude scaling.

The method proposed here involves focusing partially to fully spatially-coherent radiation onto a sample and collecting the resulting scattered radiation (the "standard data set") on an array detector. In addition to the standard dataset, an additional measurement or plurality of measurements is made of the relatively-unscattered beam, using an array detector, composing the modulus enforced probe (MEP) dataset. This additional measurement or set of measurements serves as an extra constraint, called the MEP constraint, in the phase retrieval algorithm used to reconstruct an image of the object.

The MEP dataset can be recorded before, after, simultaneously with or interleaved with the standard dataset. The MEP dataset could be measured by removing the sample from the beam and recording the radiation on the detector. Alternatively, the MEP dataset could be measured by moving the beam to a known surface and recording the radiation on the detector.

The focusing beam may be sampled simultaneously with taking the dataset, and recorded on an array detector that may be a second detector or part of the original. This sampling could happen via a partially-reflective and transmissive optic such as a beamsplitter or a diffraction grating.

If the MEP dataset is recorded simultaneously with the standard dataset, then it is possible to extend existing phase-diverse techniques beyond their current capacity. In present implementations, many phase-diverse techniques rely on the beam remaining constant over the course of recording the dataset. If a MEP image is recorded for each image in the standard dataset (for example, in between each position recorded in ptychography), then these phase-diverse techniques no longer need to rely on a stable beam. Instead of keeping one guess of the probe for the entire dataset, the algorithm can keep track of different probes for different times in the dataset (even retaining as many probes as there are images in the standard dataset). At each iteration of the reconstruction algorithm, the MEP constraint can be enforced individually for each of the probes, for example by propagating them to the detector and enforcing that their intensity matches that measured in the MEP dataset. Most existing phase-diverse techniques, such as ptychography, cannot reconstruct a different probe for every position in the dataset. Using the method described above, these techniques can be extended to enable a very unstable probe. This is highly useful, because many sources of EUV light are not sufficiently stable to record a ptychographic dataset of sufficient quality to be useful. Furthermore, even relatively stable current sources of EUV light are not stable indefinitely, so the time to record a standard dataset is limited. In both of these cases, the time to record a standard dataset can be extended significantly by using this method.

Furthermore, the MEP dataset can be formed by processing the standard dataset. If the standard dataset is a holographic dataset, then the MEP dataset involves measuring the amplitude of the reference and/or the object separately. If the standard dataset is a STXM or SRXM dataset, then the MEP dataset can be used to solve for the size and shape of the probe, informing the minimum step size that should be used in the standard dataset. If multiple modes of the illumination are simultaneously present in the standard dataset, then the MEP dataset may comprise one or more images of the largely-unscattered beam, and the different modes of the illumination may be altered independently between the images of the MEP dataset. If the illumination is partially spatially coherent, then the MEP dataset can include an image of the light scattered from a grating of known structure.

The MEP dataset can be used as a constraint in any iterative CDI algorithm that separates the illumination from the sample using the standard dataset. This can be accomplished by using a single diffraction pattern phase retrieval algorithm on the illumination during one or more iterations of the standard dataset's reconstruction algorithm. The MEP CDI algorithm could be Error Reduction, Relaxed Average Alternating Reflections, Hybrid Projection-Reflections, Difference Map, or Saddle-Point Optimization.

The inclusion of the MEP dataset in the image reconstruction can improve the reconstruction of periodic or non-periodic 2D objects, 3D objects, or time-varying processes. Additionally, it can improve the robustness of phase retrieval algorithms to noise, stage errors, stage positioning errors, or other experimental uncertainties. It can also improve the robustness to limited spatial or temporal coherence of the illumination, or the presence of mutually-incoherent modes, whose character is not exactly known.

The patent application entitled "Complex Spatially-Resolved Reflectometry/Refractometry" filed concurrently with this application and having inventors Christina Porter, Daniel Adams, Michael Tanksalvala, Elisabeth Shanblatt, Margaret Murnane, and Henry Kapteyn is incorporated herein by reference).

BRIEF DESCRIPTION OF THE DRAWINGS

FIG. 3a (Prior Art) is a flow diagram illustrating the process of reconstructing a CDI image with a standard dataset using the example of FIG. 1a.

FIG. 4a (Prior Art) shows an image of a sample obtained using a scanning electron microscope. FIG. 4b shows an image of the same sample obtained according to the present invention. FIG. 4c (Prior Art) shows a ptychographic image of the same sample obtained conventionally.

PREFERRED EMBODIMENT OF THE INVENTION

An instrument that collects an image of un-diffracted illumination (beam) in addition to a coherent diffraction imaging dataset and uses this measurement to constrain the spatial profile.

The standard dataset is formed by translating the object relative to the illumination and recording either the transmitted or reflected scattered light at each position as different images. The MEP dataset is obtained by, for example, moving the sample out of the illumination and shining the beam directly on the detector.

Figure 1A:
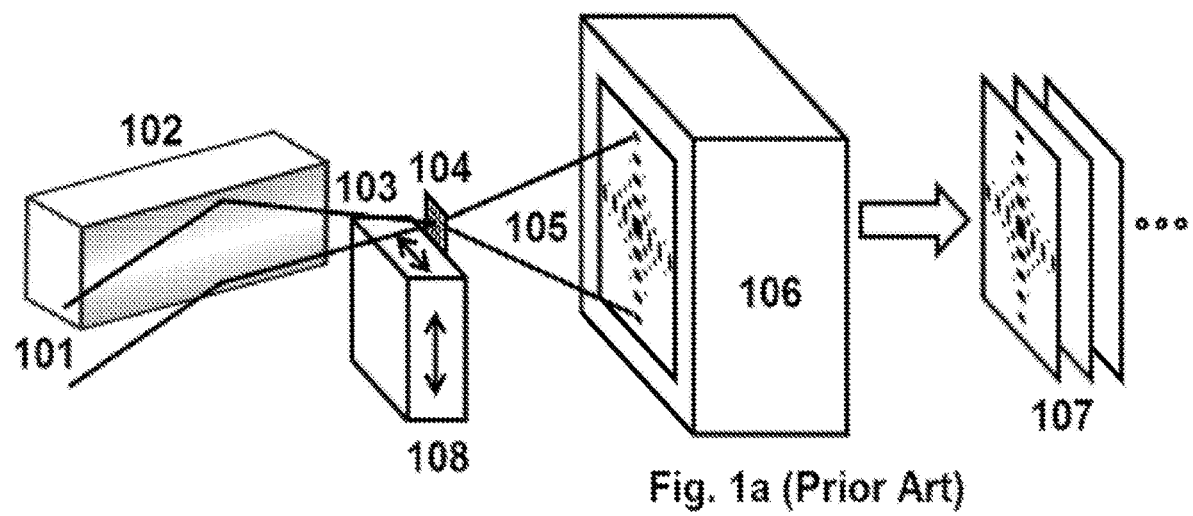
FIG. 1a (Prior Art) is a schematic block diagram illustrating a conventional transmission CDI geometry.
Figure 1B:
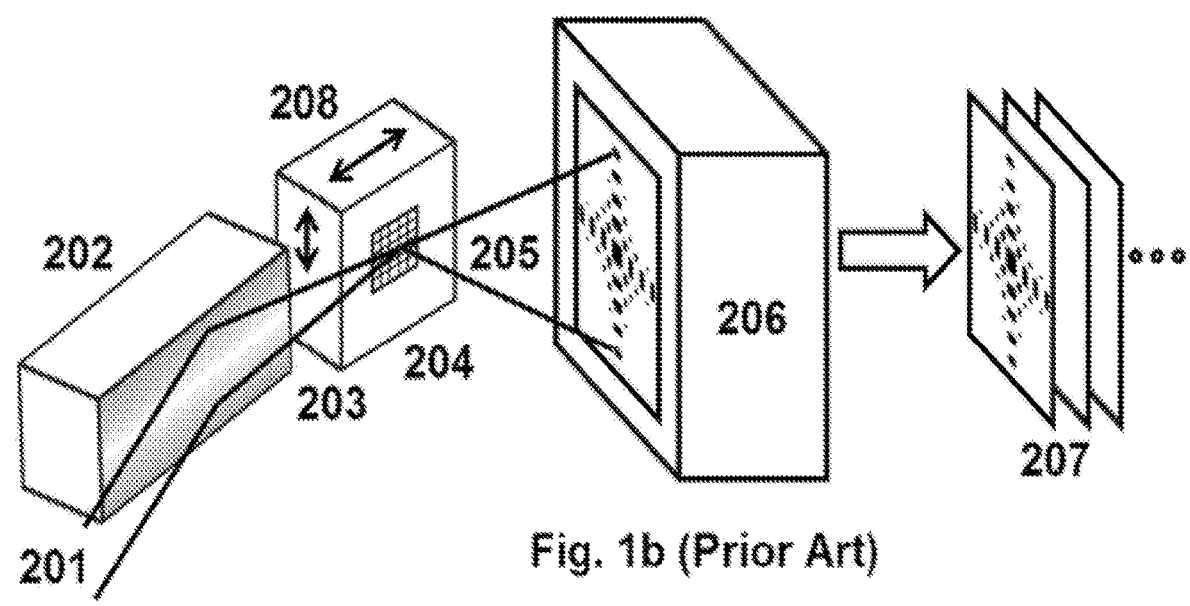
FIG. 1b (Prior Art) is a schematic block diagram illustrating a conventional reflection CDI geometry.
Figure 2A:
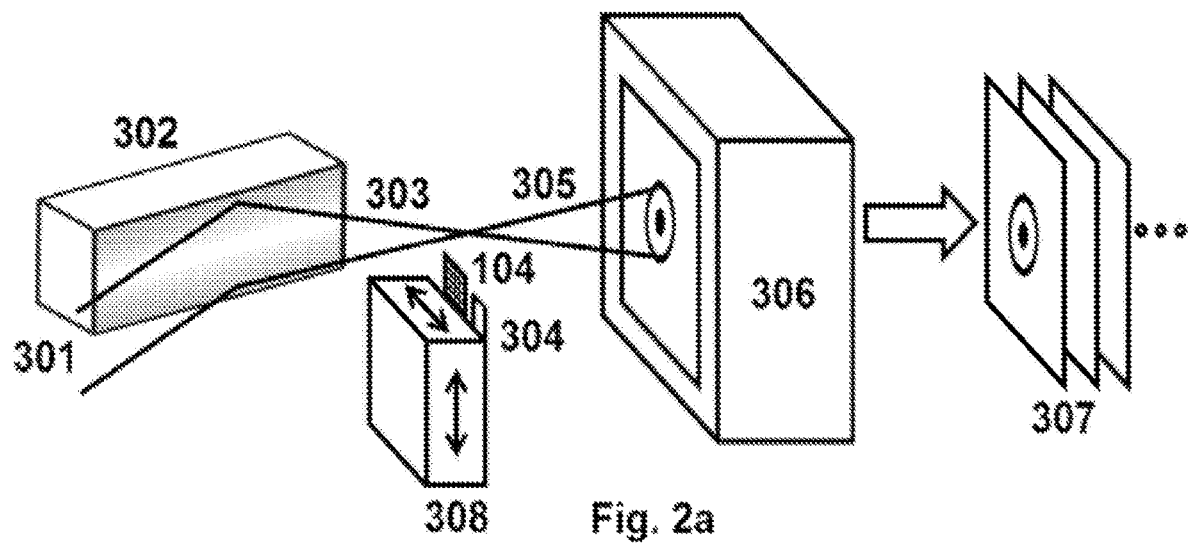
FIG. 2a is a schematic block diagram illustrating a transmission CDI embodiment according to the present invention.

FIG. 2a depicts an example setup for the acquisition of a MEP dataset 307 in transmission-mode. Incident radiation 301 is focused by focusing optic 302 into focusing beam 303 that either propagates freely to the detector 306 or is incident on a known portion of a sample 304 that may or may not be the sample 104 to be imaged. Known portion 304 could be, for instance, a smooth portion of the transmissive substrate on which the sample lies, or a grating meant divert some of the beam onto the detector. More generally, the known part of sample 404 may be a uniform part of a sample substrate, a mirror, a periodic structure, or a previously characterized structure, and preferably has known transmissivity or reflectivity if the absolute reflectance or transmittance of the sample is desired. If the known portion of the sample is intended to be uniform, then imperfections in the surface (e.g., surface roughness or dust) can degrade the MEP dataset, and may be mitigated by taking multiple MEP images with different translations between the surface and illumination (so as not to record an identical scatter pattern through the entire dataset) or by incorporating multiple translations between the surface and illumination into each image in the MEP dataset (e.g., by moving the sample while recording the MEP image) to average out some of the spurious fringes.

The transmitted, largely-unscattered light 305 is recorded on a detector 306 that may be a second detector or part of the original 106. A series of mechanical stages 308 actuates sample 304. In this figure, the mechanical stages bring the sample 304 out of the beam, allowing light 305 to propagate freely to detector 306. The one or more images acquired during this process form the MEP transmission-mode dataset 307.

Figure 2B:
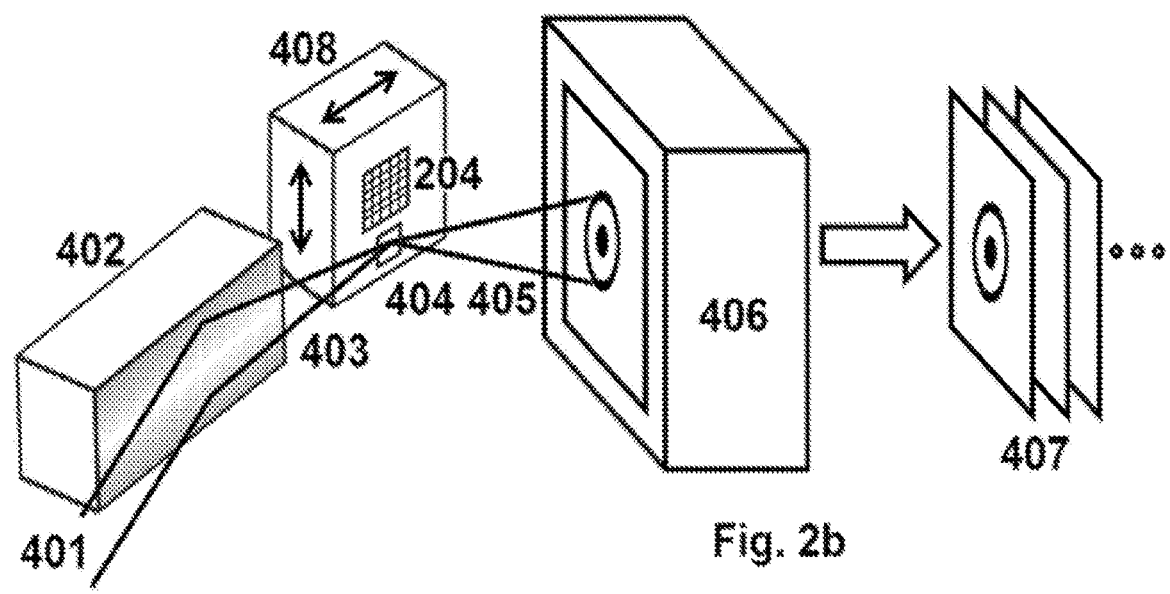
FIG. 2b is a schematic block diagram illustrating a reflection CDI embodiment according to the present invention.

FIG. 2b depicts an example setup for the acquisition of MEP dataset 407 in reflection-mode. Incident radiation 401 is focused by a focusing optic 402 into a focusing beam 403 that is incident on a known portion of sample 404 that may or may not be the sample 204 to be imaged. Known portion 404 could be, for instance, a smooth gold mirror. The reflected, largely-unscattered light 405 is recorded on detector 406. A series of mechanical stages 408 actuates known portion 404 such that it is in the path of focusing beam 403 and reflects light onto detector 406. The one or more images acquired during this process form the MEP reflection-mode dataset 407.

The focusing optic 302, 402 and detector 306, 406 used for the MEP dataset can be the same as the focusing optic 102, 202 and detector 106, 206 used for the standard dataset. Alternatively, the beam could be sampled prior to the focusing optic 302, 402 and the focusing optic 302, 402 could be aligned to the beam to very closely match the alignment of focusing optic 102, 202, and the resulting beam can be shone onto another detector 306, 406 that may be a separate detector entirely, or may be a separate portion of detector 106, 206.

Those skilled in the art of CDI will appreciate that many other setups could be used to acquire the MEP dataset 307, 407 using a variety of well-known optical elements (not shown) in common configurations (not shown). For example, if multiple wavelengths are present in the illumination, then a different spectral filter can be introduced into beam 303, 403 for each MEP image, thereby weighting the different wavelengths in a known manner. Sampling could happen via a partially-reflective and transmissive optic such as a beamsplitter or a diffraction grating whose different orders are used for the standard and MEP datasets. Use of a diffraction grating could additionally provide information about the wavelengths composing the illumination. If multiple wavelengths are present in the illumination, then a different spectral filter can be introduced into the beam for each MEP image, therefore weighting the different wavelengths in a known manner. In a similar manner, other mutually-incoherent modes, such as polarizations or time-delays, could be independently altered.

If the illumination is partially spatially coherent, then the MEP dataset can include an image of the light scattered from a grating of known structure. The resulting pattern can improve the reconstructed coherence function of the illumination. In particular, the number of grating structures illuminated by a coherent portion of the illumination affects the linewidth of the far-field diffraction pattern, and the measured linewidth can therefore improve the guess at the coherence function of the illumination.

Figure 3A:
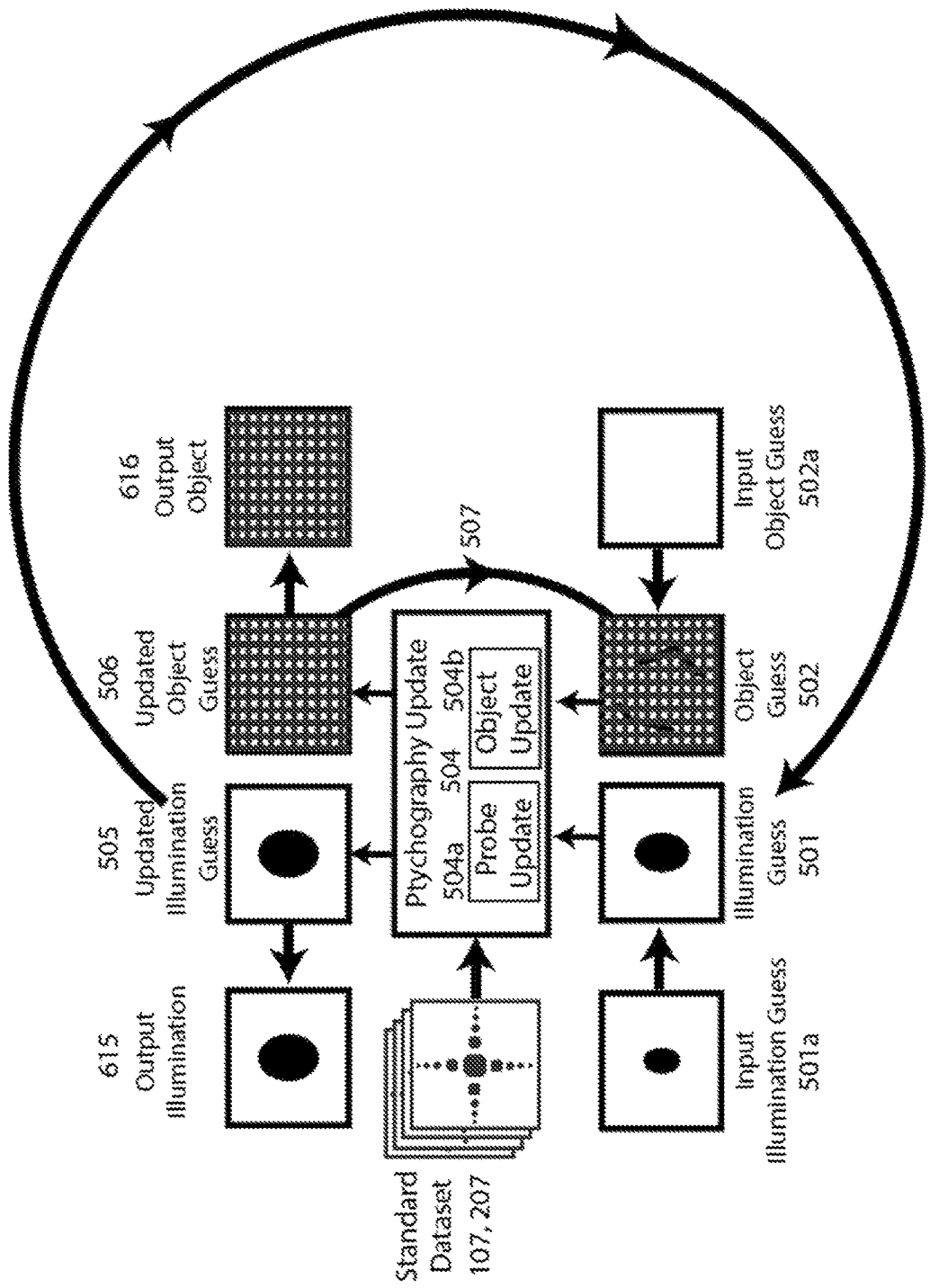
Figure 3B:
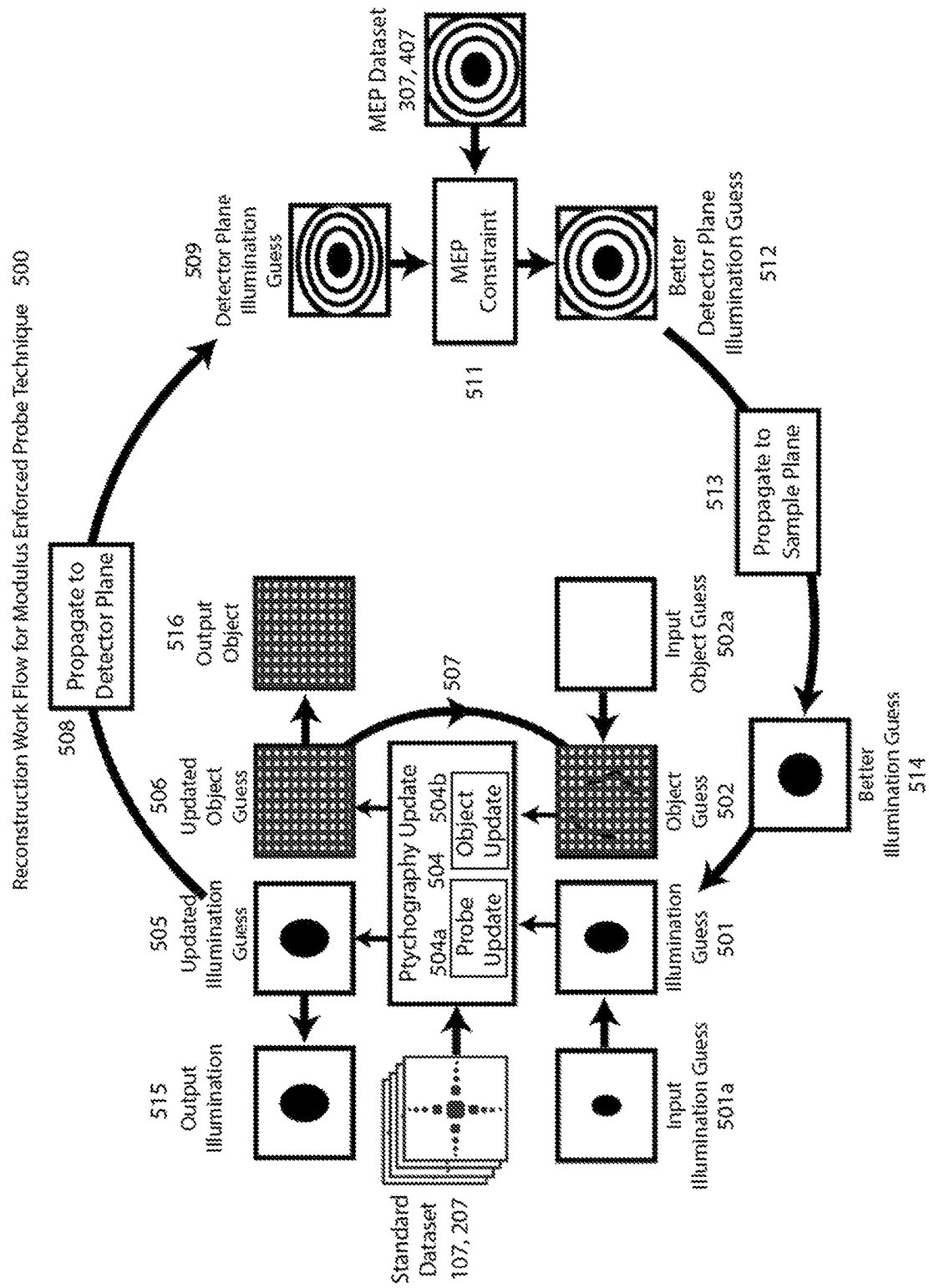
FIG. 3b is a flow diagram illustrating the process of reconstructing a CDI image with a standard dataset and a MEP dataset using the embodiment of FIG. 2A according to the present invention.

FIG. 3b shows a preferred embodiment of a reconstruction algorithm 500 according to the present invention. Beginning with standard dataset 107 or 207, original illumination guess 501a and original object guess 502a, an iteration of ptychography algorithm 504 forms an updated illumination guess 505 and updated object guess 506. Updated object guess 506 replaces original object guess 502a to become object guess 502 for future iterations of ptychography algorithm 504. During the reconstruction algorithm (as often as multiple times per application of the ptychographic update 504a,504b), updated illumination guess 505 is numerically propagated 508 to the detector plane, forming the detector plane illumination guess 509. MEP constraint 511 uses MEP dataset 307,407 to form updated detector plane illumination guess 512, for instance by replacing the amplitude of detector-plane illumination guess 511 with the measured amplitude from MEP dataset 307, 407, or by otherwise using it to minimize the error between the detector-plane illumination guess 511 and the measured amplitude from MEP dataset 307, 407. Numerically propagating back to the sample plane 513 forms a better illumination guess 514 that replaces original illumination guess 501a to become illumination guess 501 for future iterations of ptychography algorithm 504. After algorithm 504 has converged (e.g., an error metric has decreased below some value, or the image fidelity is deemed sufficient), the final guesses of the illumination 505 and complex transmissivity or reflectivity of the sample 506 are treated as outputs 515 and 516 of the reconstruction process.

Note that various MEP datasets and MEP constraints are possible, depending on the imaging setup. If the standard dataset is a holographic dataset, then the MEP dataset involves measuring the amplitude of the reference and/or the object separately.

If the standard dataset is a STXM or SRXM dataset, then the MEP dataset can be used to solve for the size and shape of the probe, informing the minimum step size that should be used in the standard dataset.

If the illumination is oscillating in time between a plurality of profiles, then the MEP dataset can comprise measurements taken at times that differently weight the different profiles. For instance, if the illumination switches sinusoidally in time between two modes, the MEP dataset can comprise measurements at different phases of this sinusoid. If the illumination changes significantly over the course of taking one or more of the images composing the standard dataset, then the MEP dataset may comprise images of the unscattered beam at different times during the changing illumination.

If multiple modes of the illumination are simultaneously present in the standard dataset, then the MEP dataset may comprise one or more images of the largely-unscattered beam, and the different modes of the illumination may be altered independently between the images of the MEP dataset. These independent changes, if known, substantially improve the ability of MEP to solve for mutually-incoherent modes.

The MEP dataset can be formed by processing the standard dataset. For example, an image in the MEP dataset can be formed by assigning each pixel to the average value that that pixel took in the standard dataset. The result may be further processed by applying a threshold to the result, setting all pixels with values lower than a significant value (e.g., 30% of the maximum of the image) to zero.

FIG. 4a (prior art) shows an image 601 of a sample obtained using a scanning electron microscope. Magnified portion 602 shows details of image 601. FIG. 4a may be considered the ground truth of object 104, 204.

FIG. 4b shows an image 603 of the same portion of the same sample obtained using MEP constraint 511 in addition to standard dataset 107,207 according to the present invention. Magnified portion 604 shows details of image 603.

FIG. 4c (prior art) shows an image 605 of the same portion of the same sample obtained only using standard dataset 107,207. Magnified portion 606 shows details of image 605. Note that the image obtained using convention ptychography is considerably less accurate than the image obtained according to the present invention.

In a preferred embodiment, standard dataset 107,207 is reconstructed using ptychography 504, incorporating MEP constraint 511 by running one iteration of RAAR on the guessed beam 501 during each iteration of ptychography 504. The MEP dataset 307,407 is used as one constraint on the probe and the ptychographic probe update 504a as the other. A preferred embodiment of the data collection apparatus is shown schematically in FIGS. 1a-2b, and a preferred embodiment of the reconstruction is shown schematically in FIG. 3. It yields a complex-valued absolute reflectivity/transmissivity image of the sample 506 and the illumination 505 in the plane of the sample. The use of unscattered illumination image 307, 407 in reconstruction algorithm 500 improves the robustness of the reconstruction algorithm and provides faster convergence over the ptychographic algorithm 504 alone. The results of such a procedure are shown in FIG. 4.

While the exemplary preferred embodiments of the present invention are described herein with particularity, those skilled in the art will appreciate various changes, additions, and applications other than those specifically mentioned, which are within the spirit of this invention.

The invention claimed is:

1. A method of determining spatially-resolved, complex scattering properties of a sample, comprising the steps of:
   a. providing at least partially spatially-coherent radiation in the form of an incident beam;
   b. delivering the incident beam onto the sample to produce scattered radiation;
   c. collecting and recording the scattered radiation with an array detector, forming a standard dataset;
   d. collecting and recording relatively unscattered radiation on the array detector, forming a MEP dataset;
   e. using the standard dataset and the MEP dataset to calculate complex scattering properties of the sample via a phase retrieval method by constraining an illumination profile using the MEP dataset.

2. The method of claim 1, where the wavelength of the radiation is EUV.

3. The method of claim 1, wherein step 1, includes the step of generating light via high harmonic generation.

4. The method of claim 1, where the standard dataset includes data from one or more of the following types of datasets: ptychographic, through-focus, tomographic, diffraction tomographic, dynamic, holographic, multimode, mutually-incoherent multimode, Fourier Ptychographic, STXM, SRXM, SEM, TEM, STEM, or other CU or point-scanning datasets.

5. The method of claim 1 wherein step 1a, further provides radiation having multiple self- or mutually-incoherent modes.

6. The method of claim 5 wherein the multiple incoherent modes comprise one of the following: differing wavelengths; differing polarizations; varying time delays, orthogonal beam profiles and partial spatial coherence.

7. The method of claim 5 wherein step 1a provides multiple incoherent modes simultaneously.

8. The method of claim 5 wherein step 1a provides multiple incoherent modes sequentially.

9. The method of claim 5, wherein step 1a provides multiple spatial modes of radiation; wherein step 1c further includes the step of collecting scattered radiation for the multiple spatial modes; and wherein step 1d further includes the step of collecting substantially unscattered radiation for the multiple spatial modes.

10. The method of claim 1, wherein step 1a further provides radiation that varies with time as step 1c is performed, and wherein step 1d further includes the step of collecting substantially unscattered radiation at various times.

11. The method of claim 1, wherein step 1d includes the step of delivering the incident beam onto a portion of the sample having known scattering properties.

12. The method of claim 11, wherein the portion of the sample is substantially not spatially-varying.

13. The method of claim 11, wherein the portion of the sample is substantially periodic.

14. The method of claim 1, wherein the MEP dataset is calculated from the standard dataset.

15. The method of claim 14, wherein the calculation includes the step of taking an average over the scattered radiation and applying a threshold to a resulting image.

16. The method of claim 1, further including the step of determining the power in the relatively unscattered radiation, wherein step 1e includes the step of using this measurement to constrain beam power.

17. The method of claim 1, wherein step 1e further includes the step of constraining the illumination profile using a single diffraction pattern phase retrieval algorithm, including: Error Reduction, RAAR, HIO, HPR, Difference Map, Saddle-Point Optimization.

* * * * *